Sept. 13, 1927.  S. H. BISHOP ET AL  1,642,058

SPRING FOR SHOCK ABSORBERS

Filed June 16, 1924

INVENTORS
S. H. Bishop
N. F. McNaught
BY
Munn &co
ATTORNEYS

Patented Sept. 13, 1927.

1,642,058

UNITED STATES PATENT OFFICE.

STANLEY HOWARD BISHOP AND NORRIS FON McNAUGHT, OF CHICAGO, ILLINOIS, ASSIGNORS, BY DIRECT AND MESNE ASSIGNMENTS, TO CROSS MANUFACTURING COMPANY, OF WOODSTOCK, ILLINOIS, A CORPORATION OF ILLINOIS.

SPRING FOR SHOCK ABSORBERS.

Application filed June 16, 1924. Serial No. 720,391.

Our invention relates to improvements in spring for shock absorber, and it consists in the combinations, constructions, and arrangements herein described and claimed.

An object of our invention is to provide a spring for shock absorbers and the like which is so constructed as to eliminate the tendency of the spring to crystallize and break at its work engaging ends. This is accomplished by bending the outermost ends of the spring about its axis in the opposite direction to which the spring is normally coiled. It is obvious that this construction greatly prolongs the life of the spring, and therefore the useful life of the shock absorber, of which it is a part.

A further object of our invention is to provide a spring for shock absorbers and the like which is reversible and therefore which greatly facilitates the manual process of assembling of the shock absorber, of which the spring is a part. Ordinarily it is necessary to place the spring in a predetermined position during the process of assembling. By use of our improved spring the spring may be dropped in the spring actuated drum and revolved in a clockwise direction, whereupon it will properly engage with the drum. In a like manner, the spring engaging member for the opposite end of the spring is engaged therewith by rotating that member in a clockwise direction, relative to the spring.

A further object of our invention is to provide a spring for shock absorbers and the like that is durable in construction, may be manufactured economically, and is efficient for the purpose intended.

Other objects and advantages will appear in the following specification, and the novel features of the invention will be particularly pointed out in the appended claims.

Our invention is illustrated in the accompanying drawings forming a part of this application in which Figure 1 is a sectional view through a shock absorber, showing our improved spring in section, on the line 1—1 of Figure 2.

Figure 2:
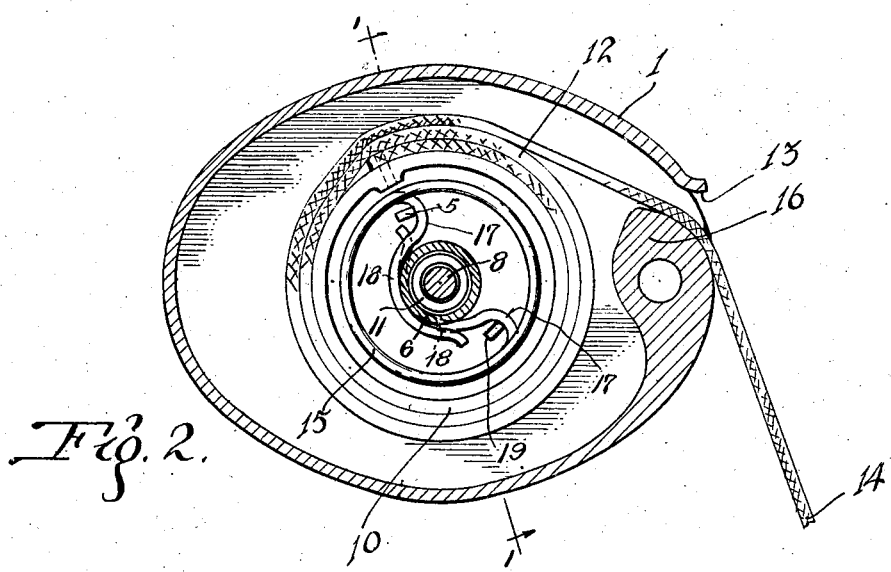
Figure 2 is a sectional view along the line 2—2 of Figure 1.
Figure 1:
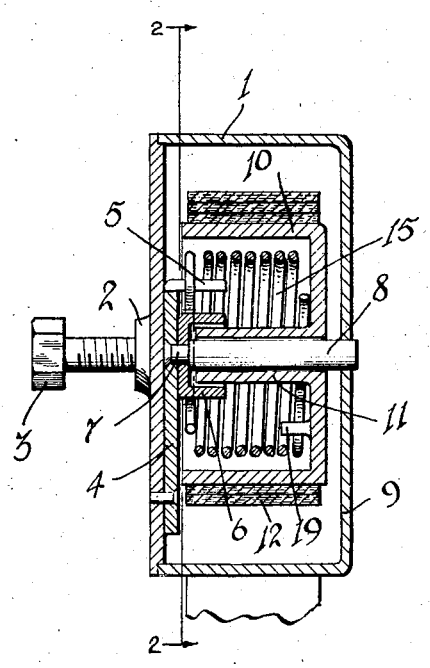

In carrying out our invention we make use of a casing 1 arranged for support by means of a boss 2, and bolt 3, upon the chassis of a motor vehicle, adjacent to the axle of the vehicle, depending upon the particular installation of the device.

A strap 4 is secured to the innermost wall of the base of the casing 1. This strap 4 is bent forwardly at 5 so as to extend into the center of the casing parallel with the axis thereof. A cup-shaped member 6 is secured to the strap 4 by the projection therethrough of the reduced portion 7 of a stationary shaft 8, which is riveted directly to the strap 4. This shaft is arranged to extend through the front wall 9 of the casing 1.

A hollow drum 10 is rotatably mounted upon the shaft 8 by means of a bearing portion 11, being tubular in construction. A fabric belt or strap 12 is coiled about the drum 10 and is permitted to project through an opening 13 in the side wall of the casing 1. The lowermost end 14 of this strap is secured to the adjacent axle shaft of the vehicle.

The subject of our invention is a torsion spring 15 disposed within the drum 10 and provided for the purpose of causing the drum 10 to rewind the strap 12 thereupon when the chassis of the vehicle moves toward the axle, as in the compression of the vehicle springs, and also to restrict the movement of the unwinding strap 12 from the drum 10 as it is drawn over a function portion 16 of the casing 1 (see Figure 2).

Figure 3:
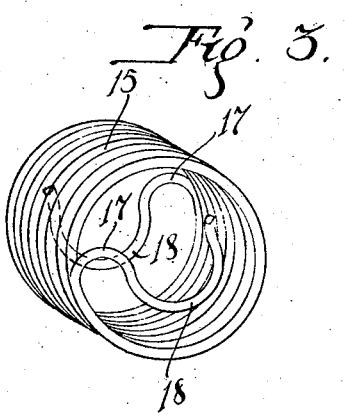
Figure 3 is a perspective view of our improved shock absorber spring.

This spring 15 is more clearly shown in Figure 3, and is constructed of a high quality of steel, having each end thereof bent to form a hook portion 17. The ends of the spring 15 are further bent parallel with the coils of the spring, but extending in a direction opposite thereto. The portion 18 of the spring is arranged to encompass the cup-shaped member 6, an dthe bearing member 11, respectively, while the hook member 17 is arranged to engage with the inwardly extending member 5 of the strap 4 and the boss 19 in the inner wall of the drum 10, respectively.

From the foregoing description of the various parts of the device the operation thereof may be readily understood.

One of the important advantages of our improved spring is that the spring is easily assembled in the shock absorber, first, because it is not necessary to place the spring in any predetermined position, but may be done by merely placing the spring in the drum 10 and rotating it until the hook-shaped member 17 engages with the boss 19. The portion 18 of the spring will find its position partially concentric with the member 11.

The drum and spring may then be placed in the casing 1 and further rotated in clockwise direction until the hook portion 17 engages with the portion 5 of the strap 4. This portion of the assembling is then complete.

The paramount advantage possessed by our improved spring is that the spring effectively resists the tendency found in the ordinary type of spring to crystallize and break at the work engaging ends. Were it not for the portion 18 actuation of the spring many successive times would tend to bend the outer-most portion of the spring contiguous with the major portion of the spring, and in this constant application of force to straighten the spring crystallization would take place, which would eventually result in the breaking of the hoop portion of the spring.

With our present improvement, however, the portion 18, which is wrapped about the cup-shaped member 6 and the tubular member 11, respectively, effectually resists all tendency to straighten the hook portion of the spring, thereby imparting force, as by rotating the drum 10 direct to the major portions of the spring.

It will be apparent that by eliminating this tendency to straighten the spring by the hook shaped portion, that we have greatly lengthened the effective life of the spring, and consequently the useful life of the shock absorber, of which the spring is a part.

In reference to Figure 2, it will be noted that the portion 18 of the spring 15 is stretched somewhat, due to engagement thereof with the cup shaped member 6. Thus the portion 18 is in close engagement with the cup shaped member 6, and the portion 18 at the opposite end of the spring is in engagement with the portion 11 at all times during the operative engagement of the spring with the drum and cap shaped member 6.

We claim:

1. In a shock absorber, the combination of a supporting plate, an anchor plate rivetted to said supporting plate and having a shaft supported thereby, a cup-shaped drum having a tubular hub therein supported on said shaft with its open end toward said plates, a lug on said anchor plate projecting into said drum, a similar lug projecting from the bottom of said drum, and a helical spring about said hub and having each end bent about one of said lugs without sharp curvature and extending backwardly about said hub to form a guide for said spring, said lugs being located substantially midway between said shaft and the helix of said spring.

2. In a shock absorber, the combination of a supporting plate, an anchor plate rivetted to said supporting plate and having a shaft supported thereby, a cup-shaped drum having a tubular hub therein supported on said shaft with its open end toward said plates, a lug on said anchor plate projecting into said drum, a similar lug projecting from the bottom of said drum, a helical spring about said hub and having each end bent about one of said lugs without sharp curvature and extending backwardly about said hub to form a guide for said spring, said lugs being located substantially midway between said shaft and the helix of said spring, and a cup-shaped retaining member supported on said shaft against said anchor plate to provide an anchor for said spring when tensioned.

NORRIS FON McNAUGHT.
STANLEY HOWARD BISHOP.